United States Patent
Zhang

(10) Patent No.: US 7,385,531 B2
(45) Date of Patent: Jun. 10, 2008

(54) ENTERING TEXT INTO AN ELECTRONIC COMMUNICATIONS DEVICE

(75) Inventor: Daniel Yalin Zhang, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 651 days.

(21) Appl. No.: 10/508,757

(22) PCT Filed: Mar. 5, 2003

(86) PCT No.: PCT/EP03/02262

§ 371 (c)(1),
(2), (4) Date: Feb. 25, 2005

(87) PCT Pub. No.: WO03/081365

PCT Pub. Date: Oct. 2, 2003

(65) Prior Publication Data

US 2005/0144566 A1      Jun. 30, 2005

Related U.S. Application Data

(60) Provisional application No. 60/369,994, filed on Apr. 3, 2002.

(30) Foreign Application Priority Data

Mar. 22, 2002 (EP) .................................. 02388024

(51) Int. Cl.
  *H03M 11/00*   (2006.01)
(52) U.S. Cl. .............................. 341/28; 345/171; 704/2
(58) Field of Classification Search .................. 341/20, 341/28, 23; 345/171, 168; 704/2, 3
See application file for complete search history.

(56) References Cited

U.S. PATENT DOCUMENTS 5,818,437 A    10/1998   Grover et al. .............. 345/326

(Continued)

FOREIGN PATENT DOCUMENTS

CN        1287461 A       3/2001

(Continued)

OTHER PUBLICATIONS

"Tegic Communications Extends Instant Messaging to Wirelsss Phones with Next Generation of T9 Text Input Software," Tegic Communications Press Release, Jul. 27, 1999.

*Primary Examiner*—Albert K. Wong
(74) *Attorney, Agent, or Firm*—Myers Bigel Sibley & Sajovec, P.A.

(57) ABSTRACT

In a method of entering text into an electronic communications device by means of a keypad having a number of keys, each key representing a plurality of letters and/or phonetic symbols, entered text is displayed on a display on the device. Possible phonetic syllables corresponding to an activated key sequence are generated. These are compared with a stored vocabulary comprising syllables and corresponding characters occurring in a given language. Those stored syllables and corresponding characters that match the possible syllables are pre-selected; and a number of these are presented in a separate first graphical object arranged predominantly on the display. Characters corresponding to one of the syllables in the first object are simultaneously presented in a second graphical object. Thus, there is provided a way of entering text with characters having a phonetic representation by means of keys representing a plurality of letters or phonetic symbols, which may be easier to use even in the case where a phonetic syllable corresponds to several characters.

35 Claims, 5 Drawing Sheets

U.S. PATENT DOCUMENTS 5,952,942 A    9/1999  Balakrishnan et al. ........ 341/20
6,054,941 A    4/2000  Chen ........................... 341/28
6,307,548 B1  10/2001  Flinchem et al. ........... 345/352

FOREIGN PATENT DOCUMENTS

EP    1085401 A1    3/2001

ENTERING TEXT INTO AN ELECTRONIC COMMUNICATIONS DEVICE

RELATED APPLICATIONS

The present application is a 35 U.S.C. §371 national phase application of PCT International Application No. PCT/EP03/02262, having an international filing date of Mar. 5, 2003 and claiming priority to European Patent Application No. 02388024.8, filed Mar. 22, 2002, and U.S. Provisional Application No. 60/369,994 filed Apr. 3, 2002, the disclosures of which are incorporated herein by reference in their entireties. The above PCT International Application was published in the English language and has International Publication No. WO 03/081365 A2.

TECHNICAL FIELD OF THE INVENTION

The invention relates to a method of entering text into an electronic communications device by means of a keypad having a number of keys, each key representing a plurality of letters and/or phonetic symbols, and wherein entered text is displayed on a display arranged on the electronic communications device, the method comprising the steps of activating a sequence of keys; generating possible phonetic syllables corresponding to said activated key sequence; comparing said possible syllables with a vocabulary stored in a memory, said vocabulary comprising syllables and corresponding characters occurring in a given language; pre-selecting those of said stored syllables and corresponding characters that match said possible syllables; and presenting a number of the pre-selected characters on said display. The invention further relates to an electronic communications device featuring the option of entering text into the device.

DESCRIPTION OF RELATED ART

Electronic communications devices, such as mobile telephones and Personal Digital Assistants (PDA's), often utilize a numeric keypad for entering numeric information, such as telephone numbers or time information, into these devices. However, there is typically also a need to enter text information into such devices. Examples are names, addresses and messages to be sent to other similar devices. Since these devices only rarely have sufficiently large dimensions for the arrangement of a normal alphanumeric keyboard, the numeric keypad must be used also for text information. Consequently, each key corresponds to multiple different characters. As an example, the "2" key typically also corresponds to the letters A, B and C.

One well known method of entering text information from such a keypad is the multi-tap method by which the user is allowed to iterate through the possible characters by pressing the corresponding key multiple times. To enter e.g. the letter "A", the user presses the "2" key a single time, while the key is pressed three times to enter the letter "C". The key must be pressed multiple times relatively fast to ensure that the correct letter is recognized. Alternatively, a separate key is used to iterate through the possibilities, once one of the numeric keys has been pressed.

An improved method uses a predictive editor application for entering and editing text information. One such method is shown in U.S. Pat. No. 6,307,548. When text is entered using predictive input, each key is only pressed once, and the display will show one of the possible letter sequences corresponding to the entered key sequence, typically the one which is most commonly used in the language of the user, or by using the exact match approach. There is no time limit, so it is possible to press the keys relatively fast after each other. If, for example, a user (using the English language) enters the key sequence "2" (ABC), "7" (PQRS) and "3" (DEF), 36 different letter sequences are possible. However, only five of these (ARE, APE, CRE, BRE and ARD) are found as words or word stems in the stored vocabulary of the device. "ARE" has the highest frequency of use and it will thus be shown in the display. If this is the word the user intended to write, it can be accepted by pressing an acceptance key, which could typically be the key used for entering a space character. If it is not the correct word, the user may step through the other proposals by using a select key until the correct word is shown at the insertion point in the text, before it is accepted with the acceptance key. During letter entry, i.e. as long as a word has not yet been accepted, the word is held "open", which is typically shown by underlining of the word (or letter sequence) or drawing of a box around it. This illustrates that the shown word is just one of the options or candidates provided by the vocabulary.

As mentioned, one candidate is presented on the display in the text message entered by the user. The other candidates may be cycled through by use of a select key, e.g. one of the arrow up/down keys. Each time a different candidate is inserted into the text on the display. If the display of the device is large enough, it is known from e.g. U.S. Pat. No. 6,307,548 to facilitate the navigation by locating a selection list region below the text region, wherein a list of at least some of the candidates is provided. One of the candidates in the selection list is marked in that it e.g. appears within a box drawn with solid or dotted lines, and the same candidate is also shown at the insertion point of the text message. Pressing a select key moves the box to the next candidate in the list which is also then shown at the insertion point. When the correct word is shown in the box in the selection list and at the insertion point, it can be accepted and the system is ready for the next word to be entered.

In some languages using other character types, such as Chinese characters, a standard phonetic representation of these characters has been adopted. As an example, "pinyin" is a phonetic representation of Chinese characters. Thus each Chinese character has a corresponding pinyin representation or pinyin syllable, which is composed of combinations of the 26 letters of the Roman alphabet, with the exception that the letter "ü" is added and the letter "v" removed, although "v" often represents "ü" on small keypads. It is noted that one pinyin representation normally represents several different Chinese characters. Thus a standard keypad of the above-mentioned type can also be used for entering such characters, and also the predictive editor can be used. An example of this is described in U.S. Pat. No. 5,952,942. The letter sequences are here considered as phonetic syllables, each of which can be represented by a number of corresponding characters. Therefore, the user must first find the intended phonetic syllable, i.e. letter sequence, as described above, and then in a next step the intended one of the corresponding characters has to be selected. Thus an entered pinyin is presented on the display, and when the user has accepted the pinyin by pressing a key, a list providing some of the characters corresponding to the selected pinyin syllable is shown. However, this procedure is quite complicated and it will be confusing to many users. Especially for inexperienced users it is not obvious how to scroll through the different candidates in two levels and select one of the candidates for insertion in the text. These problems lead to a situation where many users desist from using predictive text input.

Therefore, it is an object of the invention to provide a way of entering text using characters with a phonetic representation by means of keys representing a plurality of letters and/or phonetic symbols, which is easier to use even in the case where a phonetic syllable corresponds to several characters, and which leads to a lower error rate in the entered text.

SUMMARY

According to the invention the object is achieved in that a number of the pre-selected phonetic syllables are presented on the display in a separate first graphical object arranged predominantly on the display, and in that characters corresponding to at least one of the syllables presented in the first graphical object are simultaneously presented in a second graphical object.

By presenting the pre-selected phonetic syllables in a separate graphical object, e.g. in the form of a separate window on the display, arranged pre-dominantly on the display and simultaneously the corresponding characters in another graphical object, the user can easily get an overview of the possibilities, and it is easy to navigate between the candidates using the keys of the keypad. Thus the number of errors during text entry can be reduced. For new and inexperienced users the separate graphical object will make it more intuitive to use predictive text input, because the word candidates are shown directly and clearly on the display.

Further, the separate graphical object will also reduce the need for computational resources, which is very important in small communications devices. In the known solutions it normally takes a considerable amount of CPU power to keep the text layout up to date on the display, because the processor has to handle the process of searching for candidates in the vocabulary, presenting them in the selection list and updating the text shown at the insertion point of the text message when the user iterates through the possible candidates. With a separate graphical object there is no need to update the text at the insertion point so often. Actually, the text does not need to be updated at all before the graphical object is closed when candidate is accepted. This results in a lower and more stable processor load. This is important because the current predictive text input systems often cause a heavy load on the processor.

When the method further comprises the step of indicating distinctly one of the syllables presented in said separate first graphical object and in that the characters presented in the second graphical object correspond to the syllable distinctly indicated, it is much easier to see which one of the phonetic syllables is presently suggested, and which characters correspond thereto.

In an embodiment of the invention, the method further comprises the steps of rank ordering the pre-selected phonetic syllables according to their frequency of use in said language, and indicating distinctly as default the most commonly used phonetic syllable in said separate first graphical object. In this way it is ensured that the suggested candidate is the one that the user with the highest probability intended to enter.

When the method further comprises the step of allowing a user to indicate distinctly a different one of said pre-selected phonetic syllables, it is easy for the user to navigate between the candidates and to see which one is suggested at any given time.

When the method further comprises the steps of allowing a user to select one of the characters corresponding to the indicated phonetic syllable, and adding the selected character to the text displayed on the display, the display is updated with the selected character when the user has made his choice.

When the method further comprises the step of removing said separate first graphical object from the display when a character has been selected, the user is allowed to obtain an overview of the entire message before the process is continued with the entry of further characters. While the separate first graphical object is very useful during entry of a character, it will often be more helpful with an overview between entry of the individual characters.

The method may further comprise the step of removing said separate first graphical object from the display when a predefined period of time has elapsed since the last activation of a key. If no keys have been activated for a certain time, e.g. in the middle of a character, the user might have been disturbed, and it will often be more convenient to see the overview when the entry process is resumed. As soon as a key is activated again, the graphical object will reappear.

The method may also comprise the step of arranging said number of pre-selected phonetic syllables vertically in said separate first graphical object.

The vertical presentation of the pre-selected phonetic syllables is expedient because it corresponds to the list of the candidates stored in the memory.

In an expedient embodiment the step of allowing a user to indicate distinctly a different one of said pre-selected phonetic syllables is performed by allowing the user to navigate between individual pre-selected phonetic syllables by activating an upwards-key for indicating a phonetic syllable presented just above the phonetic syllable presently indicated, and by activating a downwards-key for indicating a phonetic syllable presented just below the phonetic syllable presently indicated.

The method may further comprise the step of allowing the user, in the case where not all pre-selected phonetic syllables are presented in said separate first graphical object, to exclude one of the presently presented phonetic syllables and instead present a phonetic syllable not presently presented by activation of one of the upwards- and downwards-keys. In this way the user can scroll through the list of candidates, even when it comprises a larger number of candidates.

The method may further comprise the step of allowing the user to navigate between individual characters in said second graphical object by activating a left arrow key and/or a right arrow key. In this way the user can easily scroll through the characters, even when there are a larger number of characters.

When the method further comprises the step of adjusting the width of said separate first graphical object according to the length of the phonetic syllables being presented, a dynamic graphical object is achieved which adapts to the size of the phonetic syllables shown.

Further the method may comprise the step of presenting the phonetic syllables in said separate first graphical object with a font size which is adjusted in accordance with the length of the phonetic syllables being presented. Thus also the presentation of long syllables is possible in the graphical object.

In an expedient embodiment the method further comprises the step of generating said possible phonetic syllables as pinyin representations. As an alternative, they may be generated as bopomofo representations.

The method may further comprise the step of showing a cursor in combination with the distinctly indicated phonetic syllable. The cursor is a further help to ensure that the attention of the user is focused on the graphical object with the syllables.

The method may further comprise the step of keeping text that is displayed outside said separate first graphical object unchanged as long as said separate first graphical object is shown on the display. In this way considerable amounts of processor resources may be saved.

Processor resources may also be saved when the method further comprises the step of updating text that is displayed outside said separate first graphical object at a low rate compared to the key activation rate as long as said separate first graphical object is shown on the display.

As mentioned, the invention further relates to an electronic communications device featuring the option of entering text into the device, and comprising a keypad having a number of keys, each key representing a plurality of letters and/or phonetic symbols; a display arranged on the electronic communications device, on which entered text may be displayed; a memory, wherein a vocabulary comprising phonetic syllables and corresponding characters occurring in a given language is stored; means for generating possible phonetic syllables corresponding to a sequence of activated keys; means for comparing said possible phonetic syllables with said stored vocabulary and pre-selecting stored phonetic syllables and corresponding characters that match said possible syllables; and means for presenting a number of the pre-selected characters on said display. When the presenting means is arranged to present a number of said pre-selected phonetic syllables on the display in a separate first graphical object arranged predominantly on the display, and to present characters corresponding to at least one of the syllables presented in the first graphical object simultaneously in a second graphical object, a way of entering text using characters with a phonetic representation by means of keys representing a plurality of characters is achieved, which is easier to use even in the case where a phonetic syllable corresponds to several characters, and which leads to a reduced error rate in the entered text.

When the presenting means is further arranged to indicate distinctly one of the syllables presented in said separate first graphical object, said distinctly indicated syllable corresponding to the characters presented in the second graphical object, it is much easier to see which one of the phonetic syllables is presently suggested, and which characters correspond thereto.

In an embodiment of the invention, the device is further arranged to rank order the pre-selected phonetic syllables according to their frequency of use in said language, and indicate distinctly as default the most commonly used phonetic syllable in said separate first graphical object. In this way it is ensured that the suggested candidate is the one that the user with the highest probability intended to enter.

When the device is further arranged to allow a user to indicate distinctly a different one of said pre-selected phonetic syllables, it is easy for the user to move around between the candidates and to see which one is suggested at any given time.

When the device is further arranged to allow a user to select one of the characters corresponding to the indicated phonetic syllable, and add the selected character to the text displayed on the display, the display is updated with the selected character when the user has made his choice.

When the device is further arranged to remove said separate first graphical object from the display when a character has been selected, the user is allowed to get an overview of the entire message before the process is continued with the entry of further characters. While the separate first graphical object is very useful during entry of a character, it will often be more helpful with an overview between entry of the individual characters.

The device may further be arranged to remove said separate first graphical object from the display when a predefined period of time has elapsed since the last activation of a key. If no keys have been activated for a certain time, e.g. in the middle of a character, the user might have been disturbed, and it will often be more convenient to see the overview when the entry process is resumed. As soon as a key is activated again, the graphical object will reappear.

The device may further be arranged to present said number of pre-selected phonetic syllables vertically in said separate graphical object. The vertical presentation of the pre-selected phonetic syllables is expedient because it corresponds to the list of the candidates stored in the memory.

In an expedient embodiment the device is further arranged to allow a user to indicate distinctly a different one of said pre-selected phonetic syllables by allowing the user to navigate between individual pre-selected phonetic syllables by activating an upwards-key for indicating a phonetic syllable presented just above the phonetic syllable presently indicated, and by activating a downwards-key for indicating a phonetic syllable presented just below the phonetic syllable presently indicated.

The device may further be arranged to allow the user, in the case where not all pre-selected phonetic syllables are presented in said separate first graphical object, to exclude one of the presently presented phonetic syllables and instead present a phonetic syllable not presently presented by activation of one of the upwards- and downwards-keys. In this way the user can scroll through the list of candidates, even when it comprises a large number of candidates.

The device may further be arranged to allow the user to navigate between individual characters in said second graphical object by activating a left arrow key and/or a right arrow key. In this way the user can easily scroll through the characters, even when the second graphical object comprises a large number of characters.

When the device is further arranged to adjust the width of said separate first graphical object according to the length of the phonetic syllables being presented, a dynamic graphical object is achieved which adapts to the size of the phonetic syllables shown.

Further the device may be arranged to present the phonetic syllables in said separate first graphical object with a font size which is adjusted according to the length of the phonetic syllables being presented. Thus also the presentation of long syllables is possible in the graphical object.

In an expedient embodiment the possible phonetic syllables are pinyin representations. As an alternative, the possible phonetic syllables may be bopomofo representations.

The device may further be arranged to show a cursor in combination with the distinctly indicated phonetic syllables. The cursor is a further help to ensure that the attention of the user is focused on the graphical object with the syllables.

The device may further be arranged to keep text that is displayed outside said separate first graphical object unchanged as long as said separate first graphical object is shown on the display. In this way considerable amounts of processor resources may be saved.

Processor resources may also be saved when the device is further arranged to update text that is displayed outside said separate first graphical object at a low rate compared to the key activation rate as long as said separate first graphical object is shown on the display.

In an expedient embodiment the generating means, comparing means and presenting means are implemented in a processor.

BRIEF DESCRIPTION OF THE DRAWINGS

The invention will now be described more fully below with reference to the drawings, in which.

DETAILED DESCRIPTION OF EMBODIMENTS

Figure 1:
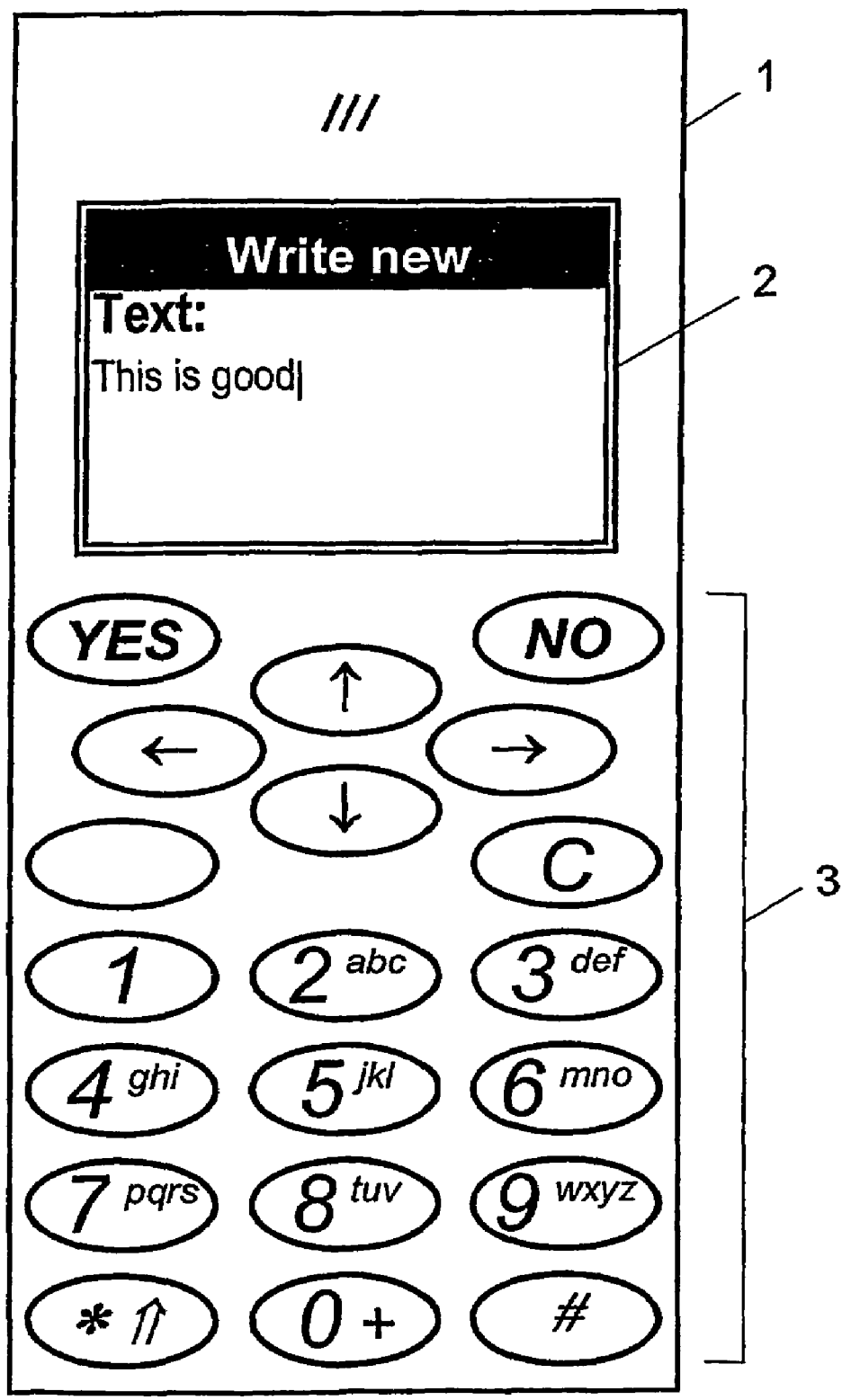
FIG. 1 shows a mobile telephone in which the invention may be used.

FIG. 1 shows an example of a device in which the invention can be used. The shown device is a mobile telephone 1, e.g. a GSM telephone and/or a UMTS telephone. Other types of telephones are CDMA, PDC, CDMA2000 and TDMA. However, it should be noted that the invention could be used in other types of devices also. As examples, PDA's (Personal Digital Assistant) and computers may be mentioned.

The telephone 1 is equipped with a display 2 and a keypad 3. The keys of the keypad 3 are used for entering information into the telephone. This information may be of many various types, such as telephone numbers, address information, instructions to the telephone and text messages to be sent to another telephone. The display 2 is used for presentation of information to the user of the mobile telephone. Also the presented information may be of various types, such as telephone numbers, address information, indications from the telephone, text messages received from another telephone, or text messages entered by the keypad 3 for later transmission to another telephone.

As shown, the keypad 3 is a numeric keypad having only a limited number of keys. Thus each key corresponds to multiple different characters when the keypad is used for entering text information. As an example the "3" key also corresponds to the letters D, E and F. To facilitate text entry many such devices are equipped with a predictive editor, which is an intelligent software protocol capable of suggesting possible character sequences corresponding to a given key sequence entered by the user. One such well known predictive editor is named T9™ (registered trademark owned by Tegic Communications, Inc.), which is commercially available and well described in the art. Another one is eZyText™ (registered trademark owned by Zy Corporation). Thus the function of the predictive editor will only be described very briefly with reference to FIG. 2. Below the function is first described for messages in a language, such as English, using the Roman alphabet, but as described later, also messages using e.g. Chinese characters can be handled.

Figure 2:
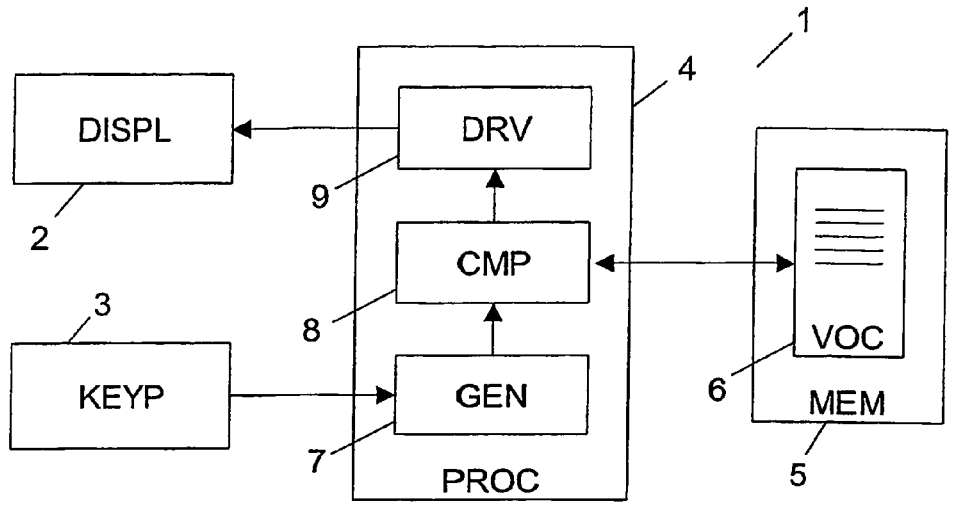
FIG. 2 shows a block diagram of the telephone in FIG. 1.

As illustrated in FIG. 2, the telephone 2 also includes a processor 4 and a memory 5. In the memory 5 a vocabulary 6 is stored which comprises a list of allowable letter sequences for a given language, i.e. letter sequences which form words or word stems in that language. Of course a device may have several different vocabularies corresponding to different languages stored in the memory. When a user enters a key sequence from the keypad 3 the possible corresponding letter sequences are generated in the unit 7 in the processor 4. If, for instance, the user (using the English language) enters the key sequence "4" (GHI), "6" (MNO), "6" (MNO) and "3" (DEF), 81 different letter sequences are possible. These are now compared (in the comparing unit 8) to the vocabulary 6, and it is found that only 12 of the 81 possible letter sequences are stored in the vocabulary 6 as English words or word stems. Thus these 12 letter sequences are now selected as candidates for presentation to the user, and the driver 9 presents them on the display 2. Often the vocabulary 6 also contains information of the frequency of use for each letter sequence in the relevant language, and in that case the selected sequences may further be ranked according to their use, so that the most commonly used letter sequence is presented at the top of the list. In this case "good" is the most commonly used word among the 12 selected letter sequences, and it is thus presented to the user as the first suggestion.

Figure 3:
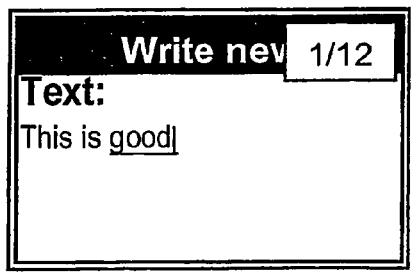
FIGS. 3 to 5 show examples of the display of a known predictive editor.

The presentation to the user is illustrated in FIG. 3, in which the user has entered the words "This is" followed by the above sequence. Since "good" is the first of the suggestions, it is shown on the display. It is shown that "good" is underlined to indicate that this word is still open, i.e. it may still be changed to another one of the selected possibilities. Further, it is indicated in the upper right corner of the display that this suggestion is the first of the 12 possibilities by showing "1/12" in a box. If this is the word the user intended to enter, it can be accepted by e.g. entering a space character. The acceptance is shown by moving the cursor to the next position, and "good" will no longer be underlined.

Figure 4:
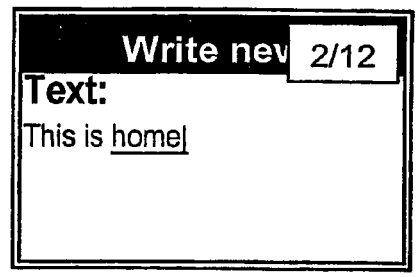
Figure 5:
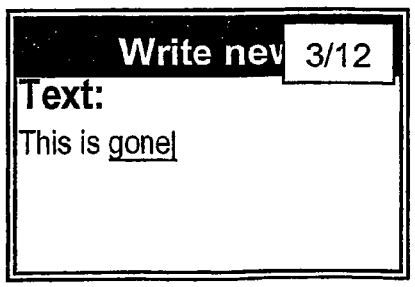

If, however, it is not the intended word, the user can move to the next one on the list by means of e.g. an "arrow down" key. As shown in FIG. 4, the system then suggests "home" and indicates "2/12" in the upper corner. In FIG. 5 this step has been repeated, and the system suggests "gone". When the intended word is shown, it can be accepted as described above, and the user can continue with the next word.

It may also be possible to go back to an earlier entered word and "re-open" it to switch to another candidate or to continue typing to achieve a longer word. In some systems there are also options to extend the vocabulary search to get "word completion". In this case a candidate longer than the number of key entries can be shown, and often this word is inserted in the vocabulary by the user.

For languages using phonetic symbols, such as Chinese, the entering of messages is a little more complicated. Below is shown as an example how Chinese characters can be entered using "pinyin" which is a standard phonetic representation of the Chinese characters. Pinyin is used in the mainland China, as well as Hong Kong and Singapore, while another representation, Bopomofo, is used today in Taiwan only. Each Chinese character has a corresponding pinyin representation or pinyin syllable, which is composed of combinations of the 26 letters of the Roman alphabet. It is noted that one pinyin-representation normally represents several different Chinese characters. Thus a standard keypad of the above-mentioned type can also be used for entering such characters, and also the predictive editor can be used. Entered letter sequences are then considered as phonetic syllables, each of which can be represented by a number of corresponding characters. The user entering messages must, when a key sequence has been entered, is first find the intended phonetic syllable, i.e. letter sequence, as described above, and then the intended one of the corresponding characters has to be selected.

An example of an improved solution according to the invention will now be described. The example uses pinyin representation of Chinese characters, but the method can also be used for other ideographical languages or representations, such as Japanese and Korean. Bopomofo can be mentioned as another example. In the pinyin representation the keys of the device can be marked with the letters of the Roman alphabet, while other representations may use keys marked with phonetic symbols, e.g. Bopomofo symbols.

A new graphical input object, e.g. in the form of a separate window, is shown on the display. This object co-exists with the text editor and the original predictive input method described above. It can be pictured as a data list with built-in search function. The data in the data list is the complete vocabulary, i.e. hundreds of pinyin syllables. However, the search function does not only sort syllables, it also prunes away all not matching syllables, thus keeping the number at a very reasonable count, typically below 10.

The first graphical object is only visible on the display when keys have been pressed and a syllable is open. It is completely invisible when a character has been accepted. The graphical object looks like an ordinary list object showing a number of candidates at the same time, and it will be described in more detail in the following.

Figure 6:
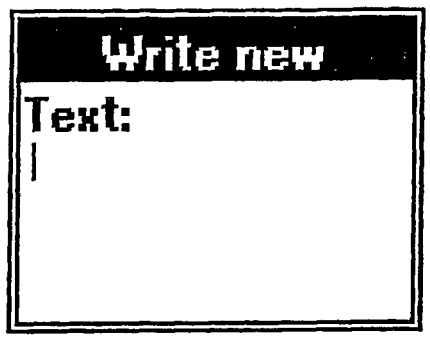
FIGS. 6 and 7 show the use of a separate graphical object on the display during activation of a key.

FIG. 6 and the following figures show an example of how the object can be shown on the display 3 of the mobile telephone 1 from FIG. 1. FIG. 6 shows the display when the device is ready for the entering of a message. A cursor indicates the insertion point where the new text message will appear as it is entered, in this case in the form of Chinese characters. In the following it is assumed that the user intends to enter the Chinese character 张 having the pinyin representation or pinyin syllable "zhang".

Figure 7:
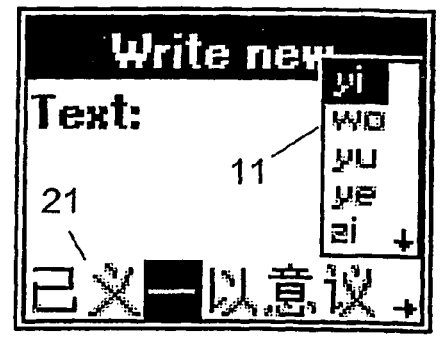

In FIG. 7 the user has activated the key "9 wxyz" to enter the first letter of the pinyin representation. The predictive editor finds those pinyin representations in the vocabulary that starts with w, x, y or z, and a number of these are presented in the new graphical object or window 11. This object is shown on the display so that it covers a part of the existing display and thus attracts the attention of the user, and it may also have a colour different from the background to improve this effect.

The graphical object is shown as a vertical list. The found pinyin representations are also rank ordered according the frequency of use, and thus in this example the graphical object 11 shows the five most commonly used of the found pinyin representations. Since "yi" is the most commonly used of the five shown syllables, it is presented at the top of the list. Further this syllable is indicated distinctly by highlighting, e.g. by a different colour, to indicate that this is the pinyin syllable suggested by the predictive editor. The little arrow at the bottom of the window 11 indicates that the list of found syllables contains more than the five shown syllables. Further, a number of the Chinese characters corresponding to the pinyin "yi" are shown horizontally in a second graphical object 21, which in this example is arranged at the bottom of the display. Also one of these characters (-) is highlighted as being the currently suggested character. The arrow shown to the right of this graphical object indicates that further characters are contained in the list.

It is noted that in FIG. 7 the suggested Chinese character is not shown at the original insertion point in the entered text. Since the attention of the user is now focused on the objects 11 and 21, this indication is not needed, and often this insertion point will be hidden behind the new object, so there is no need to update it before the character currently being entered is accepted. Therefore, processor resources may be saved by this indication not being updated. However, it is also possible just to update it at a lower rate, which will still save processor resources. It is noted that the cursor at the insertion point, i.e. in the text area, on the display is not shown in this figure. Normally, is the cursor is visible only in the beginning, i.e. before the activation of a key, and when a character has been accepted and the graphical object 11 made invisible, as will be described below. However, this cursor may also be maintained, but in that case it will normally be non-flashing in order not to attract the attention of the user.

Figure 8:
FIG. 8 shows the display when the user highlights another syllable.
Figure 9:
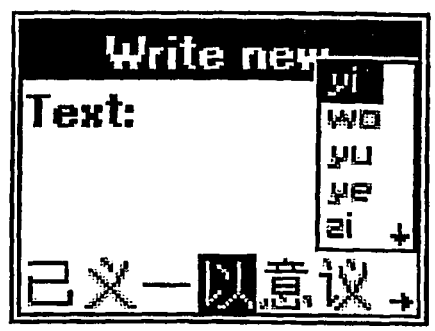
FIG. 9 shows the display when the user highlights another candidate.

The user can navigate between the presented pinyin representations and characters, e.g. by use of arrow keys (arrow up, arrow down, arrow left and arrow right) arranged as a section of the keypad 3. The up/down keys are used to highlight another pinyin representation in the list 11. Thus in FIG. 8 the user has activated the arrow down key once, and the pinyin syllable "wo" is now highlighted. The characters shown in the graphical object 21 are thus now those corresponding to this syllable. FIG. 9 shows the situation if the user had activated the arrow right key instead of the arrow down key. The pinyin syllables are here the same as in FIG. 7, but the highlighting of a character in the object 21 is now moved one step to the right.

In the situation described here the user will continue by entering the next letter of the pinyin syllable, and thus there is no need to navigate and to make any decision about which of the shown syllables or characters is actually the intended one.

Figure 10:
FIGS. 10 to 13 show the display when the key sequence is continued.

In FIG. 10 the user has now also activated the key "4 ghi" and the syllables shown in the graphical object 11 are now a number of those having one of the letters w, x, y and z as the first letter and one of the letters g, h and i as the second letter. The most commonly used of these is still "yi", and thus the characters shown in the graphical object 21 are the same as those shown in FIG. 7. Again the arrow indicates that there are more than five syllables in the list.

Figure 11:

In FIG. 11 the user has activated the key "2 abc", and again the object shows the five candidates at the top of the list and a number of the characters corresponding to the syllable "xia", which is now at the top of the list. Similarly, in FIG. 12 the key "6 mno" has been activated. It is noted that the width of the graphical object 12 has now been enlarged to accommodate the longer character sequences.

Figure 13:
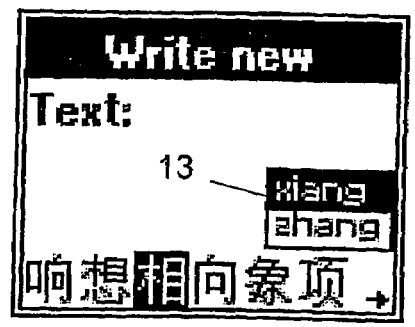
Figure 14:
FIG. 14 shows the display when a different syllable is selected.
Figure 15:
FIG. 15 shows the display when a different character is selected.
Figure 16:
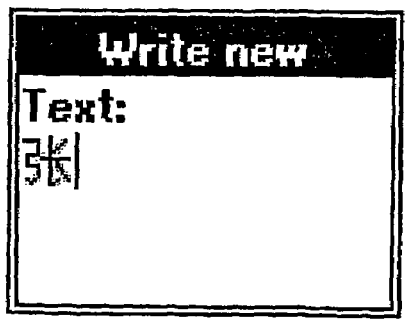
FIG. 16 shows the display when the selected character is accepted.

Finally, in FIG. 13, the key "4 ghi" has been activated, and it is seen that now there are only two syllables, "xiang" and "zhang", in the list corresponding to the entered key sequence. Therefore also the height of the object 13 has been adjusted to the two syllables shown. The syllable "xiang" is mentioned at the top of the list as the most commonly used of the two, but since the user wanted the syllable "zhang", he activates the arrow down key to highlight this syllable, as shown in FIG. 14. The characters corresponding to "zhang" are now shown in the horizontal object 21. It is seen that the intended character 张 is positioned just to the right of the currently highlighted character. Therefore the user activates the arrow right key, and the result is shown in FIG. 15 in which the correct character is highlighted. The user can now accept this character by e.g. activating a soft key or a yes key. The graphical objects 13 and 21 may then be removed and the selected character inserted at the insertion point as shown in FIG. 16. The system is now ready for the next character.

Figure 17:
FIG. 17 shows an alternative version of the display when the selected character is accepted.
Figure 18:
FIG. 18 shows a different way of navigating between the syllables.

Alternatively, the graphical object 21 may be maintained on the display. Often characters are associated to each other so that after a certain character, certain other characters are very likely to occur. Therefore, when a character has been accepted and inserted into the text as above, the graphical object 21 can present a list of characters that are likely to follow the accepted one. This is illustrated in FIG. 17 in which a number of characters associated to, or likely to follow, the accepted character 张 is shown. If the user actually intended to enter one of these characters after the one already accepted, it lo can be accepted directly, and the time to enter another syllable is saved. Similarly, the graphical object 21 could also be shown in FIG. 6, i.e. before the entering of characters is initiated. In this case it could present characters which are often used as the first characters in a new message. If the user actually wishes to start with one of these, it can be accepted directly It can be noted that in the example described above all the syllables beginning with the entered key sequence are listed in the list of which the first five members are shown in the graphical object 11, 12 or 13. Thus in FIG. 7 the list is very long since only one letter has been entered. Alternatively, the list can be limited to only those pinyin syllables that actually match the entered key sequence, i.e. one letter syllables in the first step, two letter syllables in the next, and so on. When all syllables beginning with the entered key sequence are listed, as above, the user does not necessarily have to enter all the letters in the wanted pinyin representation, because the syllable sought for is also included in the list provided after only one or a few key strokes. As an example, from FIG. 12 the user can activate the arrow down key a number of times instead of entering the last letter. As shown in FIG. 18, the syllable "zhang" is highlighted after five arrow down activations, and from hereon it is just a matter of finding the wanted character by activating the arrow right key once, as in FIG. 15. In FIG. 18 the highlighting of a syllable is moved to the bottom of the list so that now the syllables above the highlighted one are visible. Of course the highlighting could also stay at the top of the list, while the syllables of the list are moved up or down correspondingly.

Figure 12:

As mentioned above, the width of the graphical object 12 in FIG. 12 was enlarged compared to the object 11 in FIG. 7 to accommodate the longer pinyin syllables. In case of even longer syllables the width of the object can be further enlarged. As letters are added, the width of the object is enlarged to accommodate the syllables. To avoid too many layout changes the possible list widths can be chosen in steps like 25%, 50% and 100% of the full width. If letters are deleted the object width can either be reduced, or the size can be kept unchanged. Keeping the size makes it look less "jumpy". If the syllable for some reason is so long that it cannot fit into the object even with the full width, the syllable may be divided to appear on two or more lines, or the object may disappear completely so that the system returns to the normal predictive editor format. However, this is a very uncommon situation.

Figure 19:
FIG. 19 shows the display when a larger font size is used in the graphical object.

The font size of the letters shown in the object may also be changed. As shown in FIG. 19, which correspond to FIG. 7, the list can show fewer syllables having a larger font. Typically the list object can start with the largest font and the smallest width, when the user starts entering letters for a new character. FIG. 19 also illustrates that the graphical object can also be arranged in the middle of the display instead of the location to the right as in the other figures.

Although it is not shown in the examples above, a cursor may also be shown just after the highlighted syllable to further accentuate this syllable and to indicate the insertion point of the next letter. The original cursor present in the text entry object itself, i.e. the editor, might as mentioned before be turned off, or it can be shown non-flashing or some other kind of hibernation mode to not confuse the user.

in the examples mentioned above the second graphical object 21 is used for the presentation of the Chinese characters corresponding to the syllable that is highlighted in the first graphical object. However, it can be noted that the second graphical object may also be used for other purposes, such as presenting words in the Roman alphabet. As an example, in the English language the first object may present the words or word stems matching the entered key sequence, i.e. also having the same number of letters. In this case the second graphical object could present long or combined words beginning with the letter sequence highlighted in the first graphical object, or associated words. The user then has the possibility of selecting one of the longer words suggested or to continue entering further letters.

Even though the input system described above has many advantages, such as being faster and more accurate than the original predictive editor, it can of course be considered as a helping tool for the user, and therefore it may also be possible to turn the function off, if a user in some circumstances prefers the original version of the predictive editor.

Although a preferred embodiment of the present invention has been described and shown, the invention is not restricted to it, but may also be embodied in other ways within the scope of the subject-matter defined in the following claims.

The invention claimed is:

1. A method of entering text into an electronic communications device by means of a keypad having a number of keys, each key representing a plurality of letters and/or phonetic symbols, and wherein entered text is displayed on a display arranged on the electronic communications device, the method comprising:
   activating a sequence of keys;
   generating possible phonetic syllables corresponding to said activated key sequence;
   comparing said possible syllables with a vocabulary stored in a memory, said vocabulary comprising syllables and corresponding characters occurring in a given language;
   pre-selecting those of said stored syllables and corresponding characters that match said possible syllables; and
   presenting a number of the pre-selected characters on said display, wherein a number of said pre-selected phonetic syllables are presented on the display in a separate first graphical object arranged predominantly on the display, and wherein characters corresponding to at least one of the syllables presented in the first graphical object are simultaneously presented in a second graphical object.

2. A method according to claim 1, further comprising: indicating distinctly one of the syllables presented in said separate first graphical object, wherein the characters presented in the second graphical object correspond to the syllable distinctly indicated.

3. A method according to claim 2, further comprising: rank ordering the pre-selected phonetic syllables according to their frequency of use in said language, and indicating distinctly as default the most commonly used phonetic syllable in said separate first graphical object.

4. A method according to claim 2, further comprising: allowing a user to indicate distinctly a different one of said pre-selected phonetic syllables.

5. A method according to claim 2, further comprising: allowing a user to select one of the characters corresponding to the indicated phonetic syllable, and adding the selected character to the text displayed on the display.

6. A method according to claim 5, further comprising: removing said first separate graphical object from the display when a character has been selected.

7. A method according to claim 1, further comprising: removing said separate first graphical object from the display when a predefined period of time has elapsed since the last activation of a key.

8. A method according to claim 4, further comprising: arranging said number of pre-selected phonetic syllables vertically in said separate first graphical object.

9. A method according to claim 8, wherein allowing a user to indicate distinctly a different one of said pre-selected phonetic syllables comprises:
allowing the user to navigate between individual pre-selected phonetic syllables by activating an upwards-key for indicating a phonetic syllable presented just above the phonetic syllable presently indicated; and
activating a downwards-key for indicating a phonetic syllable presented just below the phonetic syllable presently indicated.

10. A method according to claim 9, further comprising: allowing the user, in the case where not all pre-selected phonetic syllables are presented in said separate first graphical object, to exclude one of the presently presented phonetic syllables and instead present a phonetic syllable not presently presented by activation of one of the upwards- and downwards-keys.

11. A method according to claim 1, further comprising: allowing the user to navigate between individual characters in said second graphical object by activating a left arrow key and/or a right arrow key.

12. A method according to claim 1, further comprising: adjusting the width of said separate first graphical object according to the length of the phonetic syllables being presented.

13. A method according to claim 1, further comprising: presenting the phonetic syllables in said separate first graphical object with a font size which is adjusted according to the length of the phonetic syllables being presented.

14. A method according to claim 1, further comprising: generating said possible phonetic syllables as pinyin representations.

15. A method according to claim 2, further comprising: showing a cursor in combination with the distinctly indicated phonetic syllable.

16. A method according to claim 1, further comprising: keeping text that is displayed outside said separate first graphical object unchanged as long as said separate first graphical object is shown on the display.

17. A method according to claim 1, further comprising: updating text that is displayed outside said separate first graphical object at a low rate compared to the key activation rate as long as said separate first graphical object is shown on the display.

18. An electronic communications device configured for entering text into the device, comprising:
a keypad having a number of keys, each key representing a plurality of letters and/or phonetic symbols;
a display arranged on the electronic communications device, on which entered text may be displayed;
a memory, wherein a vocabulary comprising phonetic syllables and corresponding characters occurring in a given language is stored;
means for generating possible phonetic syllables corresponding to a sequence of activated keys;
means for comparing said possible phonetic syllables with said stored vocabulary (6) and pre-selecting stored phonetic syllables and corresponding characters that match said possible syllables; and
means for presenting a number of the pre-selected characters on said display, wherein said presenting means is arranged to present a number of said pre-selected phonetic syllables on the display in a separate first graphical object arranged predominantly on the display, and to present characters corresponding to at least one of the syllables presented in the first graphical object simultaneously in a second graphical object.

19. An electronic communications device according to claim 17, wherein said presenting means is further configured to indicate distinctly one of the syllables presented in said separate first graphical object, said distinctly indicated syllable corresponding to the characters presented in the second graphical object.

20. An electronic communications device according to claim 19, wherein the device is further configured to rank order the pre-selected phonetic syllables according to their frequency of use in said language, and indicate distinctly as default the most commonly used phonetic syllable in said separate first graphical object.

21. An electronic communications device according to claim 19, wherein the device is further configured to allow a user to indicate distinctly a different one of said pre-selected phonetic syllables.

22. An electronic communications device according to claim 19, wherein the device is further configured to allow a user to select one of the characters corresponding to the indicated phonetic syllable, and add the selected character to the text displayed on the display.

23. An electronic communications device according to claim 22, wherein the device is further configured to remove said separate first graphical object from the display when a character has been selected.

24. An electronic communications device according to claim 18, wherein the device is further configured to remove said separate first graphical object from the display when a predefined period of time has elapsed since the last activation of a key.

25. An electronic communications device according to claim 21, wherein the device is further configured to present said number of pre-selected phonetic syllables vertically in said separate first graphical object.

26. An electronic communications device according to claim 25, wherein the device is further configured to allow a user to indicate distinctly a different one of said pre-selected phonetic syllables by allowing the user to navigate between individual pre-selected phonetic syllables by activating an upwards-key for indicating a phonetic syllable presented just above the phonetic syllable presently indicated, and by activating a downwards-key for indicating a phonetic syllable presented just below the phonetic syllable presently indicated.

27. An electronic communications device according to claim 26, wherein the device is further configured to allow the user, in the case where not all pre-selected phonetic syllables are presented in said separate first graphical object, to exclude one of the presently presented phonetic syllables and instead present a phonetic syllable not presently presented by activation of one of the upwards- and downwards-keys.

28. An electronic communications device according to claim 18, wherein the device is further configured to allow the user to navigate between individual characters in said second graphical object by activating a left arrow key and/or a right arrow key.

29. An electronic communications device according to claim 18, wherein the device is further configured to adjust the width of said separate first graphical object according to the length of the phonetic syllables being presented.

30. An electronic communications device according to claim 18, wherein the device is further configured to present the phonetic syllables in said separate first graphical object with a font size which is adjusted according to the length of the phonetic syllables being presented.

31. An electronic communications device according to claim 18, wherein said possible phonetic syllables are pinyin representations.

32. An electronic communications device according to claim 19, wherein the device is further configured to show a cursor in combination with the distinctly indicated phonetic syllable.

33. An electronic communications device according to claim 18, wherein the device is further configured to keep text that is displayed outside said separate first graphical object unchanged as long as said separate first graphical object is shown on the display.

34. An electronic communications device, according to claim 18, wherein the device is further configured to update text that is displayed outside said separate first graphical object at a low rate compared to the key activation rate as long as said separate first graphical object is shown on the display.

35. An electronic communications device according to claim 18, wherein said generating means, comparing means and presenting means are implemented in a processor.

\* \* \* \* \*